UNITED STATES PATENT OFFICE.

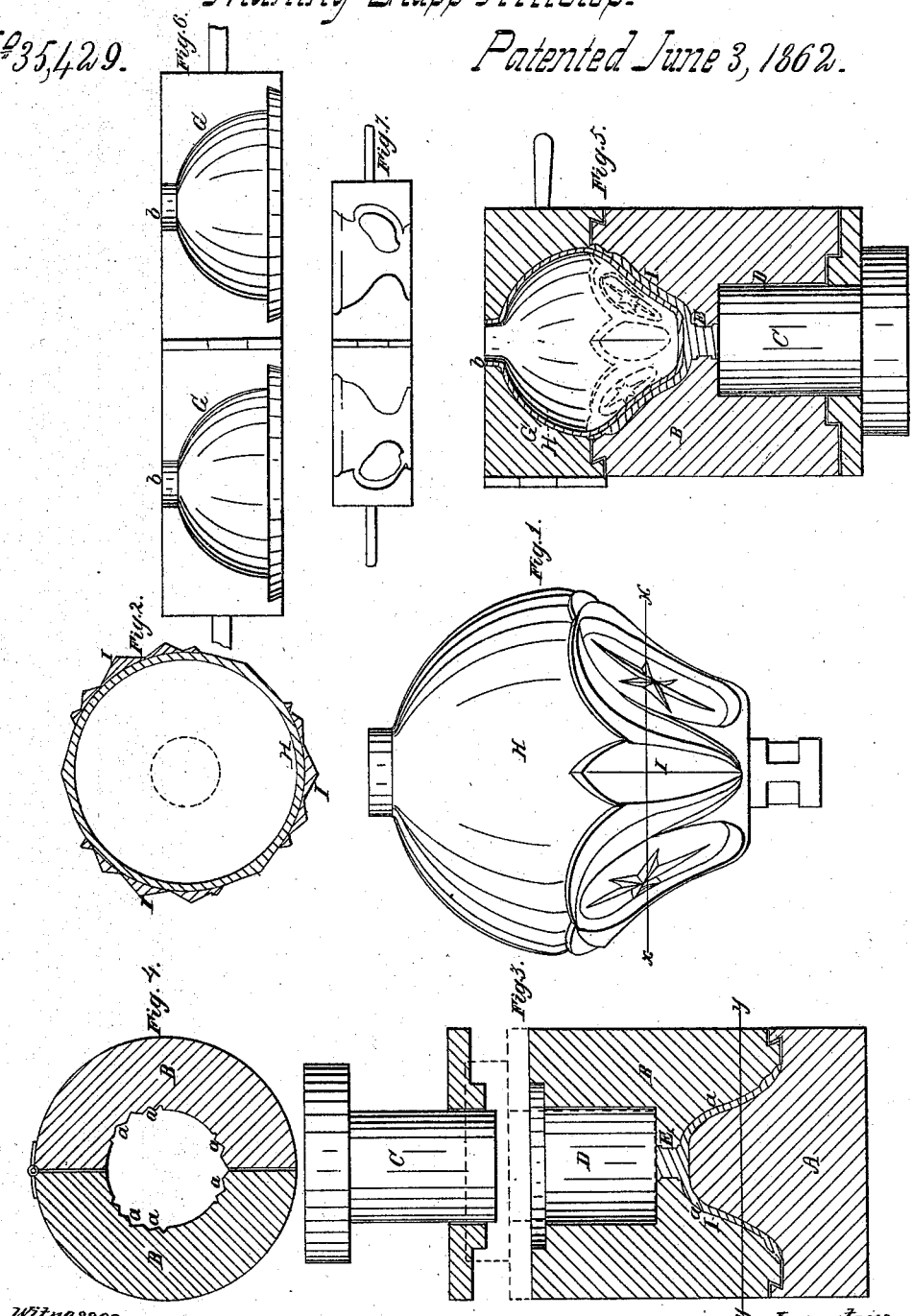

J. S. ATTERBURY, AND T. B. ATTERBURY, JAMES REDDICK, OF PITTSBURG, PENNSYLVANIA.

IMPROVEMENT IN THE MANUFACTURE OF HOLLOW GLASSWARE IN BAS-RELIEF.

Specification forming part of Letters Patent No. 35,429, dated June 3, 1862.

*To all whom it may concern:*

Be it known that we, J. S. ATTERBURY, T. B. ATTERBURY, and JAMES REDDICK, of Pittsburg, in the county of Allegheny and State of Pennsylvania, have produced a new Manufacture of Hollow Glassware in Bas-Relief, of which the following is a full description, reference being had to the accompanying drawings, forming part of this specification, in which—

Figures 1 and 2 show an elevation and horizontal section of a specimen of the new manufacture. Figs. 3, 4, 5, 6, and 7 show means adapted for producing said specimen of the new manufacture.

The same letters of reference in the different figures indicate corresponding parts.

Under this patent the nature of our invention does not consist in either the method or the means for producing hollow glassware in bas-relief, as this was patented to us on the 4th of March, 1862; but it consists in the new manufacture itself—to wit, hollow glass articles with open illuminated bas-relief work, as herein described.

To enable others skilled in the art to produce our new manufacture, we will proceed to describe such means and methods as we have found practically useful in its production.

In producing a lamp-bowl or "peg" with illuminated bas-relief work on its surface, as illustrated in Figs. 1 and 2, a base-plate, A, with a spherical, conical, or other desired form of core on its top, is placed in a glass-manufacturer's press, as is usual in making ordinary articles of glassware. Around and over this core a flask or mold, B, of the form shown is fitted, so that a space exists between the core and the mold at those points where illuminated bas-relief work is to be molded solid. This mold has the design of the desired ornamental bas-relief work wrought in it, as shown in Fig. 4 at *a a*. The core is smooth or plain on its surface. The plunger C, with follower, of the press is now adjusted for being lowered into the cylindrical chamber D of the flask B, and just before it is depressed melted glass of red color or other illuminated color is poured into the chamber D and allowed to flow around the core by the small passage E, and immediately thereafter the plunger C is pressed down upon the glass and all remaining fluid glass forced out of the chamber D into the spaces between the core and the flask in a manner to give a solid formation to the skeleton bas-relief work. The dotted lines show how the plunger descends into the chamber D and the position that the follower occupies when it has fully descended. The next step is to invert the mold, with bas-relief work, plunger, and follower in it, as shown in Fig. 5, leaving the base-plate and core in their place. This done, a two-part flask, G, Fig. 6, is fitted on top of the inverted mold, as shown in Fig. 5. The two-part flask has a hole, *b*, in its top, and has a hinge-joint, on which it opens and closes. The blower now gathers sufficient flint or white glass on the end of his blow-pipe and forms it into suitable shape to blow a lamp bowl or peg. This ready, the flask G is opened and the prepared lump of glass is placed down on the inside of the illuminated skeleton bas-relief work. The flask G having been closed, the blower blows through the orifice *b* and out of the lump of glass which was laid on the illuminated bas-relief work a flint or other white glass lamp bowl or peg, H, as shown in Fig. 5 and in Figs. 1 and 2, the illuminated work I standing in bas-relief on the outside of the bowl, and by their brilliancy of color in contrast with the light glass produce a very handsome and showy effect.

Instead of blowing the lower half of the flint or white glass portion of the bowl or peg, the bas-relief work can be produced in the manner described and shown, and the mold reversed and melted glass poured into the mold and pressed by a plunger upon the inside surface of the bas-relief work, and the upper portion finished by blowing in the flask G, or in the old way by heating and bending over with shears or ordinary tools.

If we want to make a goblet, we press the bas-relief work, as before described, reverse the mold, and press the flint or white glass in the bas-relief.

As the forms and sizes of the articles vary, so also must the molds be adapted thereto.

Lamp bowls or pegs and other articles with handles may and have as readily been produced as articles which have no projecting parts. (See illustration in Fig. 7.)

We have described and shown particularly but one style of article and bas-relief work; but it is obvious that the new manufacture can be extended to a great variety of articles by simply making changes in the form of the mold and in the character of the design and still following the principle of operation set forth.

What we claim as our invention, and desire to secure by Letters Patent, is—

A new manufacture consisting of glassware with its open illuminated relief-work on its surface, substantially as described.

J. S. ATTERBURY.
T. B. ATTERBURY.
JAS. REDDICK.

Witnesses:
A. B. STEVENSON,
JOHN C. STEVENSON.